United States Patent [19]

Cooper

[11] Patent Number: 4,796,599

[45] Date of Patent: Jan. 10, 1989

[54] PORTABLE COOKING GRILL DEVICE

[76] Inventor: Robert Cooper, 910 Steele St., Denver, Colo. 80206

[21] Appl. No.: 179,662

[22] Filed: Apr. 11, 1988

[51] Int. Cl.⁴ .............................................. F24B 3/00
[52] U.S. Cl. ..................................... 126/30; 126/25 A; 126/9 R
[58] Field of Search ............... 126/25 R, 25 A, 29, 126/30; 403/104, 105; 248/166, 167, 168, 170, 436; 99/449, 450

[56] References Cited

U.S. PATENT DOCUMENTS

| | | | |
|---|---|---|---|
| D. 186,487 | 10/1959 | Brooks | 126/30 |
| 2,523,641 | 9/1950 | Alvarez | 126/30 |
| 2,868,189 | 1/1959 | Watrous | 126/30 |
| 2,960,979 | 11/1960 | Stone | 126/30 |
| 3,344,780 | 10/1967 | Anderson | 126/30 |
| 4,548,193 | 10/1985 | Marogil | 126/30 |

*Primary Examiner*—James C. Yeung
*Attorney, Agent, or Firm*—Dorr, Carson, Sloan & Peterson

[57] ABSTRACT

A portable cooking grill device is formed from two vertical posts removably attached to the upturned ends of a U-shaped base. The cooking surface of the device is a grill having a rod attached along its rear edge, and a plurality of parallel rods extending perpendicular thereto from front to back of the grill. Two braces attached to the grill extend diagonally downward and rearward from the grill. The vertical posts pass through the grill between adjacent parallel rods. The grill is held in place with respect to the vertical posts and base by the rod attached along the rear edge of the grill which seats against the back of the vertical posts, and by the distal ends of the diagonal braces being seated against the front of the vertical posts. A number of horizontal ribs may be spaced along the length of the vertical posts to provide better support for the braces.

6 Claims, 2 Drawing Sheets

PORTABLE COOKING GRILL DEVICE

BACKGROUND OF THE INVENTION

1. Field of the Invention.

This invention relates generally to the field of cooking grills and cooking stands. More specifically, the present invention is a portable cooking grill that can be compactly stored, easily transported to a picnic or campground, and quickly assembled for use.

2. Prior Art.

A wide variety of portable cooking grills or cooking stands are disclosed in the prior art. For example, U.S. Pat. Nos. 4,117,825 (Robertson) and 3,344,780 (Anderson), which appear to be the closest prior art references, disclose portable cooking stands where the cooking surface is supported from a number of vertical posts. Anderson also shows that the height of the cooking surface is adjustably determined by means of a number of horizontal ribs spaced along the length of the vertical posts. However, the Anderson device is inherently unstable due to the lack of a stable base, and lack of means to control undesired rotation of the grill around the vertical post. The Robertson device, on the other hand, appears to be more stable, but is needlessly complex. The numerous retaining bars used to adjust the height of the cooking surface add weight and bulk, and would tend to make the device top-heavy. The hinge mechanism shown in FIG. 5 used by Robertson to fold up the base of the device is an unnecessary complexity that is subject to corrosion and failure due to close proximity to the fire. None of the prior art references teach or suggest the particular combination of features incorporated into the present invention, such as the vertical posts attached by sockets to the base, and the grill rods and braces used to adjust and stabilize the grill with respect to the vertical posts.

SUMMARY OF THE INVENTION

The present invention discloses a portable cooking grill device having a U-shaped base with vertically up-turned ends; two vertical posts are removably attached to the ends of the base; a cooking grill with a horizontal rod extending along the back edge of the grill and a plurality of parallel rods extending perpendicular thereto from front to rear of the grill; and two braces attached to the grill extending diagonally downward and rearward from the grill. The device is assembled by: (1) attaching the posts to the base; (2) passing the posts through the grill between adjacent parallel rods; and (3) bracing the grill with the back rod of the grill seated against the rear of the posts and the distal ends of the braces seated against the horizontal ribs on the front of the posts.

A primary object of the present invention is to provide a portable cooking grill having the advantages of simplicity and durability.

Another object of the present invention is to provide a portable cooking grill that is light weight and be easily stored, transported and assembled on site.

Another object of the present invention is to provide a portable cooking grill that is also sturdy and resistant to unwanted movement of the cooking surface.

BRIEF DESCRIPTION OF THE DRAWINGS

The present invention may be more readily understood in conjunction with the accompanying drawings in which.

DETAILED DESCRIPTION OF THE INVENTION

Figure 1:
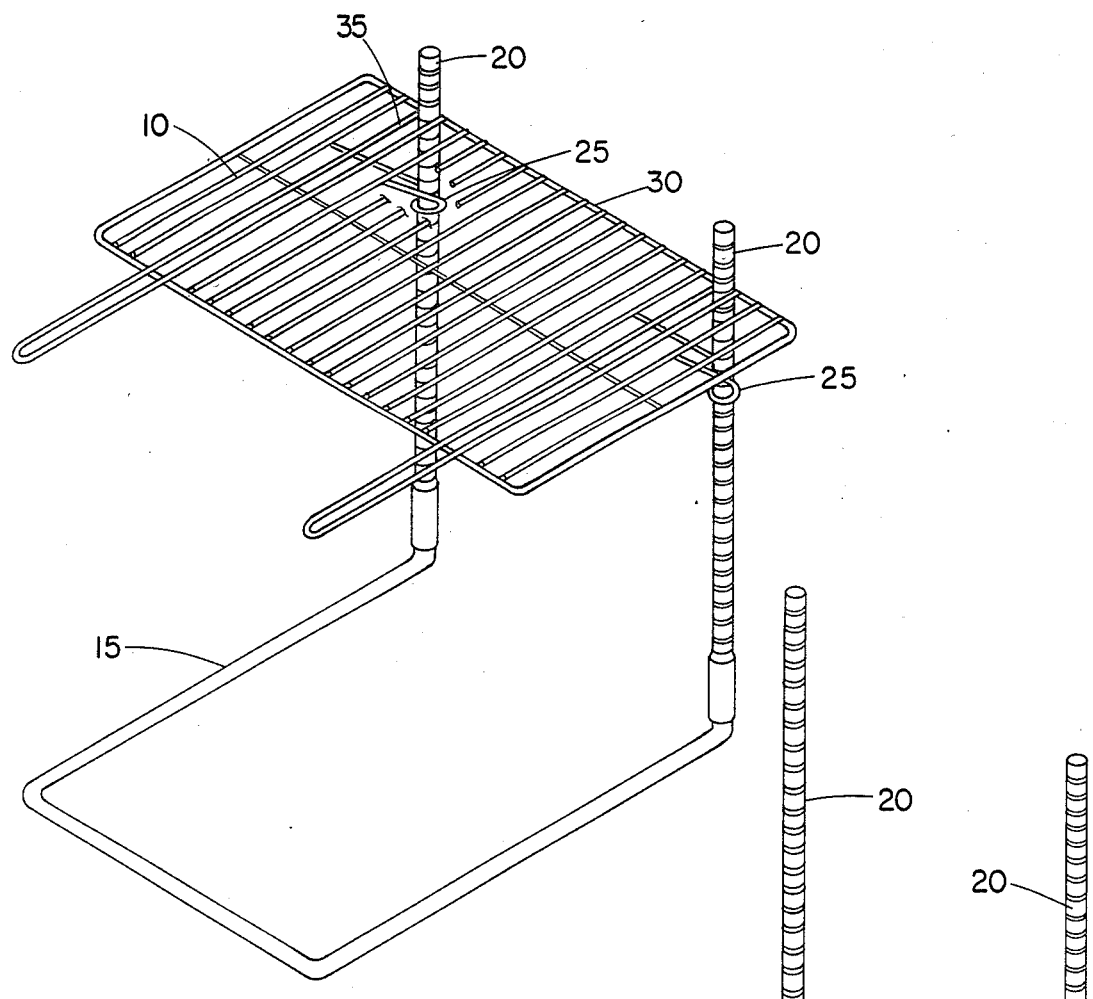
FIG. 1 is a perspective view showing the fully assembled cooking grill device, with a portion of the grill cut away to reveal a diagonal brace.

As shown in FIG. 1, the cooking grill device generally comprises a cooking surface or grill 10, a U-shaped base 15, and two vertical posts 20 removably attached to the base. Two braces 25 extend diagonally downward and rearward from the grill. A number of handles may also be attached to the front of the grill to facilitate adjustment of the grill height.

Figure 2:
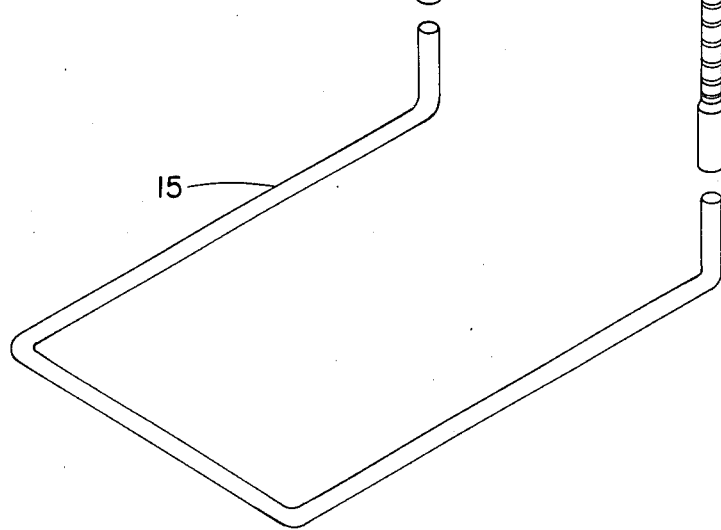
FIG. 2 is a perspective view showing the manner in which the vertical posts removably attach to the ends of the U-shaped base.

As shown in FIG. 2, the device is assembled by first attaching the vertical posts 20 to the base 15. This base has a generally U-shaped horizontal cross section. However, the ends of the base extend vertically upward, perpendicular to the plane of the remainder of the base. Both vertical posts have a recessed socket at their lower end allowing the vertical posts to be removably seated over the ends of the base in vertical orientation.

Figure 3:
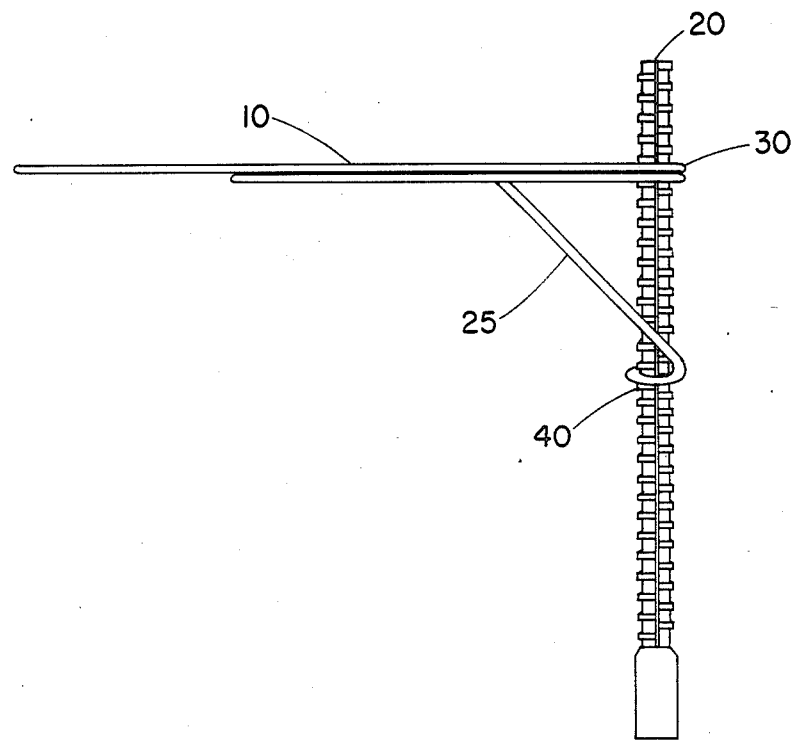
FIG. 3 is a partial side view of the upper portion of the cooking grill device from FIG. 1, showing the manner in which the grill is secured to a vertical post.
Figure 4:
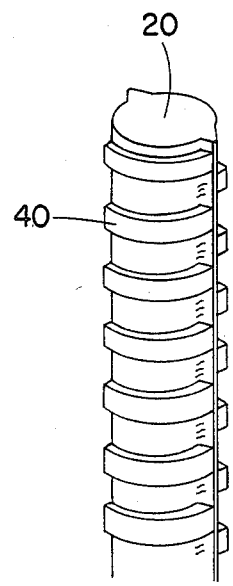
FIG. 4 is a perspective view showing the horizontal ribs spaced along the length of a vertical post.

FIG. 3 is a side view of the grill 10 and one of the vertical posts 20. Assembly of the cooking grill device is completed by passing the vertical posts through the grill 10 between adjacent parallel rods 35. The rod 30 extending along the rear of the grill braces against the back of the vertical posts. The distal end of both diagonal braces 25 extending from the bottom of the grill seat against the horizontal ribs 40 on the front of the vertical posts. These horizontal ribs are more clearly shown in FIG. 4. In the assembled state, the grill is securely held in place with respect to the vertical posts and base against motion in any direction. Lateral motion of the grill with respect to the base and vertical posts is prevented by the parallel rods 35 extending from the front to rear of grill between which the vertical posts pass. The spacing between these vertical rods is only slightly greater than the diameter of the vertical posts. Motion of the grill to the front or back is prevented by the diagonal braces and the rod extending along the rear edge of the grill. Rotational movement or twisting of the grill is effectively prevented by the use of two vertical posts.

The height of the grill is adjusted by a lifting upward on both grill handles to slightly tilt the grill and release the diagonal braces 25 from engagement with the horizontal ribs 40 on the vertical posts 20. This allows the grill to slide freely up or down the vertical posts. After the grill has been moved to the desired height, the braces are seated against the horizontal ribs to hold the grill in place simply by returning the grill to a horizontal orientation.

The cooking grill device is disassembled by reversing the process outlined above. An important advantage of the present invention lies in the fact that the disassembled components can be easily and compactly stacked together for storage and transportation. With the exception of the short vertical end sections of the base, all of the components are flat. This allows all of the components to fit conveniently in a flat box or a conventional backpack.

I claim:

1. A cooking grill device comprising:
    (a) A base;
    (b) Vertical posts removably attached to the base;
    (c) A grill having a rod extending along the rear edge of the grill, and a plurality of parallel rods extending perpendicular thereto from the front to the back of the grill; said grill being removably attachable to the vertical posts, with each of the vertical posts passing through the grill between adjacent parallel rods, and with the rod extending along the rear edge of the grill braced against the back of the vertical posts; and
    (d) Braces attached to the grill, extending diagonally downward and rearward from the grill, the distal ends of which are braced against the front of the vertical posts.

2. The cooking grill device of claim 1, further comprising a number of horizontal ribs spaced along the length of the vertical posts, against which the distal ends of the braces are seated.

3. The cooking grill device of claim 1, wherein the spacing between the parallel grill rods is slightly greater than the diameter of the vertical posts.

4. The cooking grill device of claim 1, further comprising a number of handles attached to the front of the grill.

5. A cooking grill device comprising:
    (a) A U-shaped base having ends which vertically extend upward from the plane of the base;
    (b) Two vertical posts removably attached to the ends of the base;
    (c) A grill having a rod extending along the rear edge of the grill, and a plurality of parallel rods extending perpendicular thereto from the front to the rear of the grill; said grill being removably attachable to the vertical posts, with each of the vertical posts passing through the grill between adjacent parallel rods, and with the rod extending along the rear edge of the grill braced against the back of the vertical posts; and
    (d) Two braces attached to the grill extending diagonally downward and rearward from the grill, the distal ends of which are braced against the front of the vertical posts.

6. The cooking grill device of claim 5, wherein the vertical posts are attached to the ends of the base by means of a socket at the bottom of each vertical post which fits over an end of the base.

* * * * *